(12) United States Patent
Deng et al.

(10) Patent No.: US 7,587,554 B2
(45) Date of Patent: Sep. 8, 2009

(54) DEVICE AND METHOD FOR PROVIDING DATA EXCHANGE AND STORAGE

(75) Inventors: Guoshun Deng, Guangdong (CN); Xiaohua Cheng, Guangdong (CN); Feng Xiang, Guangdong (CN)

(73) Assignee: Netac Technology Co., Ltd., Guangdong (CN)

( * ) Notice: Subject to any disclaimer, the term of this patent is extended or adjusted under 35 U.S.C. 154(b) by 235 days.

(21) Appl. No.: 10/529,455

(22) PCT Filed: Sep. 26, 2003

(86) PCT No.: PCT/CN03/00823

§ 371 (c)(1),
(2), (4) Date: May 26, 2005

(87) PCT Pub. No.: WO2004/029811

PCT Pub. Date: Apr. 8, 2004

(65) Prior Publication Data

US 2005/0216624 A1    Sep. 29, 2005

(30) Foreign Application Priority Data

Sep. 26, 2002    (CN) ................................ 02 1 34847

(51) Int. Cl.
*G06F 13/12* (2006.01)
*G06F 12/00* (2006.01)

(52) U.S. Cl. .................. 711/115; 711/100; 711/103; 711/154

(58) Field of Classification Search ................ 711/100, 711/103, 115, 154; 710/74
See application file for complete search history.

(56) References Cited

U.S. PATENT DOCUMENTS 5,014,192 A * 5/1991 Mansfield et al. ............. 707/1

(Continued)

FOREIGN PATENT DOCUMENTS

CN    1367438    9/2002

(Continued)

OTHER PUBLICATIONS

Shirvaikar, Mukul. "Digital Camera Design with JPEG, MPEG4, MP3, and 802.11 Features". 2002 Embedded Systems Conference. Mar. 2002. pp. 1-12. http://www.techonline.com/learning/techpaper/194700061.*

(Continued)

*Primary Examiner*—Tuan V. Thai
(74) *Attorney, Agent, or Firm*—Ladas & Parry LLP

(57) ABSTRACT

The invention relates to a device and method for providing data exchange and storage. The device comprises a controller module (62) which includes a firmware for controlling operation of each modules in the data exchange and storage device (60) and performing data processing and information exchange; and an internal memory module (61) for storing data under the control of the controller module (62); a system interface (63) module for connecting with the system interface and performing data exchange with the data processing system (10) under control of the controller module (62); and an external storage interface module (64) for connecting with external storage equipment and performing data exchange with the external storage equipment under control of the controller module (62). The device can accomplish connection with the data processing system of various types of interfaces and external storage equipment of various types of interfaces. The device can also implement functions that the data processing system access to the interior storage module and the external storage equipment. Thus, the device of this invention is called user's personal moveable storage center.

18 Claims, 15 Drawing Sheets

U.S. PATENT DOCUMENTS

| | | | |
|---|---|---|---|
| 5,696,984 A * | 12/1997 | Nagata et al. | 358/1.11 |
| 6,134,631 A * | 10/2000 | Jennings, III | 711/117 |
| 6,208,044 B1 * | 3/2001 | Viswanadham et al. | 310/12 |
| 6,259,932 B1 | 7/2001 | Constien | |
| 6,535,243 B1 * | 3/2003 | Tullis | 348/207.1 |
| 6,658,202 B1 * | 12/2003 | Battaglia et al. | 386/117 |
| 6,687,453 B1 * | 2/2004 | Sakamoto et al. | 386/46 |
| 6,789,164 B2 * | 9/2004 | Su et al. | 711/112 |
| 6,819,341 B2 * | 11/2004 | Dow et al. | 715/772 |
| 6,839,864 B2 * | 1/2005 | Mambakkam et al. | 714/5 |
| 2002/0022500 A1 | 2/2002 | Minematsu | |
| 2002/0063690 A1 | 5/2002 | Chung et al. | |

FOREIGN PATENT DOCUMENTS

| | | |
|---|---|---|
| CN | 2513159 | 9/2002 |
| EP | 1146428 | 10/2001 |
| GB | 2 333 005 A | 7/1999 |
| JP | 11-511925 A | 10/1999 |
| JP | 2001-109697 A | 4/2001 |
| JP | 2001-359178 A | 4/2001 |
| JP | 2002-73438 A | 3/2002 |
| WO | 01/58138 A1 | 8/2001 |

OTHER PUBLICATIONS

J. Rink et al; "Kommunikationsassistenten Sieben Smartphones IM Vergleich" CT Magazin Fuer Computer Technik, Heise Zeitschriften Verlag, Hannover, DE, No. 14, Jul. 2, 2001, pp. 92-99, XP001103595.

J. Rink: "Taschenfund Smartphone Sagem Wa 3050 MIT GSM-Anbindung", CT Magazin Fuer Computer Technik, Heise Zeitschriften Verlag, Hannover DE, No. 18, Aug. 27, 2001, p. 78, XP001103560.

Supplementary European Search Report—dated May 23, 2008; Application No./Patent No. 03753232.2—1238 PCT/CN0300823.

* cited by examiner

DEVICE AND METHOD FOR PROVIDING DATA EXCHANGE AND STORAGE

TECHNICAL FIELD

The present invention relates to data processing technology, more specifically relates to a device capable of performing data exchange and storage between an external storage equipment and a data processing system or between external storage equipments, and a method thereof.

BACKGROUND ART

In recent years, with rapid development and wide applications of information technology and data technology, the data storage technology is improved quickly in accordance with Moore's Law, of which changes on the innovation of storage medium, expansion of storage capacity and storage mode are representative.

At present, various storage cards including SM card, CF card, MMC card and SD card, etc., are based on Flash Memory as medium, and are widely applied to digital equipments, such as digital camera, digital video, etc., as a storage device, due to its reliability of performance and expandability. However, such a storage device or storage medium has clear shortcomings, which exist clearly in the following aspects:

1) Small storage capacity. The capacity of various storage cards existing in the market currently includes 16M, 32M, 64M and 128M, while the storage cards up to the capacity level of gigabytes "GB" are costly, and therefore are unacceptable for ordinary consumers. The number of files of digital photo or picture stored in storage medium of megabytes is very limited. For example, when a SM storage card of 16 M is used to store digital photos or pictures, only four can be stored using SHQ format with a resolution of 2560×1920 pixels, only ten can be stored using HQ format with a resolution of 2560×1920 pixels, and only one photo or picture can be stored using TIFP format with a resolution of 2560×1920 pixels.

2) Limitation of occasions of using such a storage card. A storage card is a passive storage device, and must be connected to a computer as the data processing system for operations of write and read performance on the storage card. On occasions where carrying a computer may be inconvenient or no computer is available, the storage card cannot be used at all, and thus the usability thereof is low.

3) Card specialty and incompatibility. Due to the different standards adopted by different digital equipment manufactures and different interface standards of computers, an interface converter (e.g. card reader) must be required to perform data conversion between interfaces when these computers are connected to process data. In this case, if a plurality of different types of storage cards are desired, the user may need multiple card readers, and therefore, the cost of devices is high, and operation is complicated.

SUMMARY OF THE INVENTION

In view of the shortcomings in prior art, the present invention aims to provide a device capable of realizing data exchange and storage, and a method thereof. Even in the case where a storage device is not connected with a data processing system, it is capable of exchanging and storing data with other storage devices.

According to one aspect of the present invention, it provides a data exchange and storage device comprising a controller module including a firmware for controlling operation of modules in the data exchange and storage device and performing data processing and information exchange; an internal memory module which stores data under the control of the controller module; a system interface module which is connected with a data processing system and performs data exchange with the data processing system under the control of the controller module; an external memory device interface module for connecting with an external storage equipment and performing data exchange with the external storage equipment under control of the controller module.

According to another aspect of the present invention, it provides a method of data exchange and storage, which uses the data exchange and storage device provided in accordance with the first aspect of the prevent invention to realize data exchange and storage among the data exchange and storage device, an external storage equipment and a host data processing system, the method of data exchange and storage comprises the steps of:

1) the controller module of the data exchange and storage device detecting characteristic information of the external storage equipment connected with the corresponding interface of the external storage equipment interface module, and choosing the corresponding interface protocol according to the characteristic information of the external storage equipment to establish a connection with the external storage equipment; and 2) according to a request from the data processing system or a user, the controller module controlling the data exchange and storage device to perform a data exchange with the external storage equipment or the data processing system, and controlling data access to the internal memory module and external storage equipment.

Compared with the prior art, the present invention has the following advantages: in the case where there is no data processing system connected therewith, the device of the invention is capable of storing the data in the external storage equipment into the internal memory module of the invention, or storing the data in the internal memory module of the invention into the external storage equipment since the device of the present invention itself has data processing capability. The internal memory medium of the invention is expandable and changeable. When the internal memory module of the invention is a removable hard disk, the mass storage of mobile data can be implemented. In addition, a plurality of host interfaces and external storage equipment interfaces of the invention enable connection with a data processing system of different types of interface and with a plurality of different types of external storage equipment, and enable read and write functions of the data processing system to the data of the internal memory module and the external storage module of the present invention, such that the device of the present invention may be used as a personal MSC (Moveable Storage Center).

DETAILED DESCRIPTION OF PREFERRED EMBODIMENTS

The embodiments of the present invention will be described hereinafter with reference to the accompanying drawings.

The data exchange and storage device of the present invention can realize data exchange between all kinds of external storage equipments (including removable storage disks and storage cards), and between the external storage equipments and a host data processing system, and store the data having read out from the external storage equipments or the host data processing system into either side or both sides.

The data processing system of the present invention refers generally to all kinds of electronic equipments having a data processing capability, which includes but not limited to various personal computers, small computers, microcomputers, palm computers, hand-held computers, notebook computers, and data processing workstations.

Figure 1:
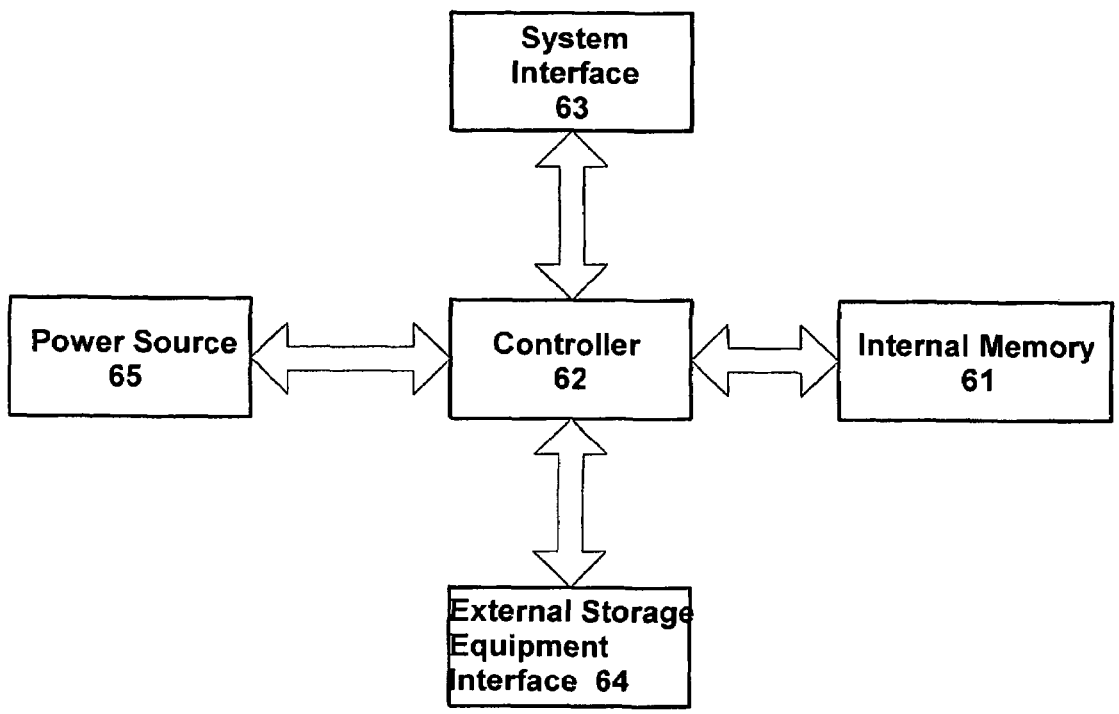
FIG. 1 is a block diagram of a data exchange and storage device according to an embodiment of the present invention.

As shown in FIG. 1, the data exchange and storage device of the present invention includes an internal memory module 61 for data storage, a system interface module 63 for connection with a data processing system, an external storage equipment interface module 64 for transmitting data to and from an external storage equipment, a controller module 62 for connecting with and controlling all the above-mentioned modules, and a power source module 65 for supplying the power to those modules. In the controller module 62, provided is an operating and controlling firmware which is used to drive the data exchange and storage device of the present invention to perform the data storage operation to external storage equipments even when the data exchange and storage device is not attached to any data processing system.

In the above embodiment of the present invention, the internal memory module 61 may include but not limited to hard disk, removable hard disk, semiconductor storage device, and optical-medium storage driving device, these storage devices may use a storage medium, such as, magnetic storage medium, optical storage medium and semiconductor storage medium. The storage medium of the semiconductor storage device uses but not limited to flash memory, DRAM, EEPROM, SRAM, FRAM, MRAM and Millipede, and such a storage medium may comprise one or more semiconductor chips.

In one embodiment of the present invention, DRAM may be used as a storage medium for the internal memory module 61. DRAM is more applicable for a memory of high speed and big capacity because of its expendability. However, such a memory may lose all of the stored data when the power is off. Therefore, when DRAM is used in the internal memory module 61 of the data exchange and storage device of the present invention, a power source (such as battery power) should be provided in order to keep data stored in the DRAM for a relatively longer time.

In another embodiment, the internal memory module 61 may be removed. In this case, the above data exchange and storage device may work as a card reader device with a plurality of interfaces or a connection device between the external storage equipment and the data processing system, thereby enabling data accesses between the external storage equipment and the data processing system.

In a further embodiment, an ejection device (not shown in the figure) may be mounted at the interface of the external storage equipment interface module 64. The ejection device will eject the external storage equipment if it is pressed.

Figure 3:
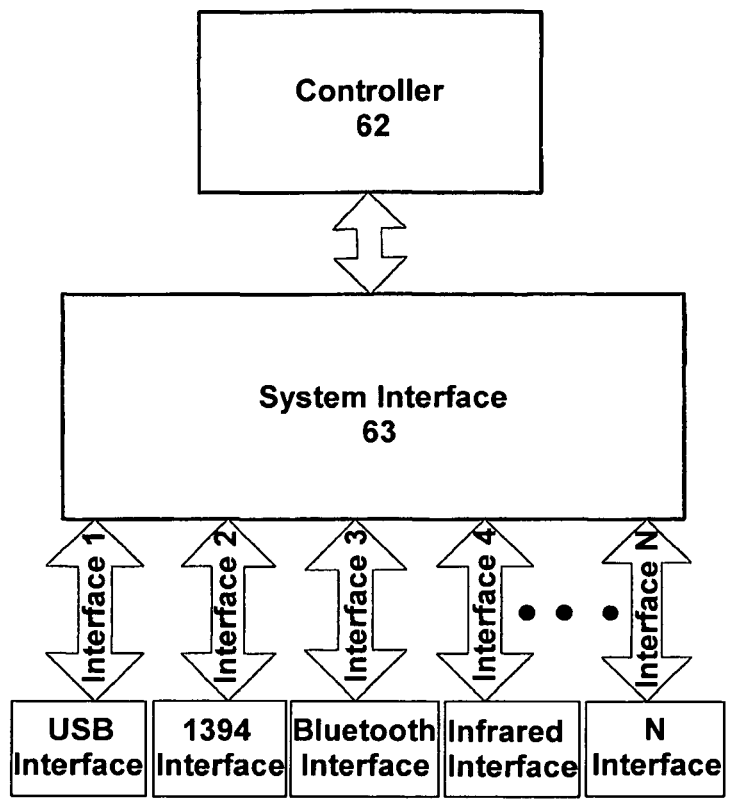
FIG. 3 is a principle block diagram of the system interface module according to an embodiment of the present invention.

The system interface module 63 may use a universal interface, such as a wired universal interface or a wireless universal interface. As shown in FIG. 3, the controller module 62 may be connected with a single interface or a plurality of interfaces of the same type or different types via the system interface module 63. Each of the interfaces is connected to a different interface for a data processing system in accordance with respective interface protocols. The type of interface of the system interface module 63 may include but not limited to USB interface, IEEE1394 interface, Bluetooth interface, IrDA infrared interface, HomeRF interface, IEEE802.11a or IEEE802.11b interface, IEEE802.11g interface, SCSI, RS232 interface, printer ports, wired wide area/local area interface and/or wireless wide area/local area interface, and the like. The system interface module 63 is under control of the controller module 62 to convert the data to be transmitted into a data format adapted to the protocol corresponding to an interface according to the types of the respective interfaces, or to interpret the received data format according to the interface type.

Figure 4:
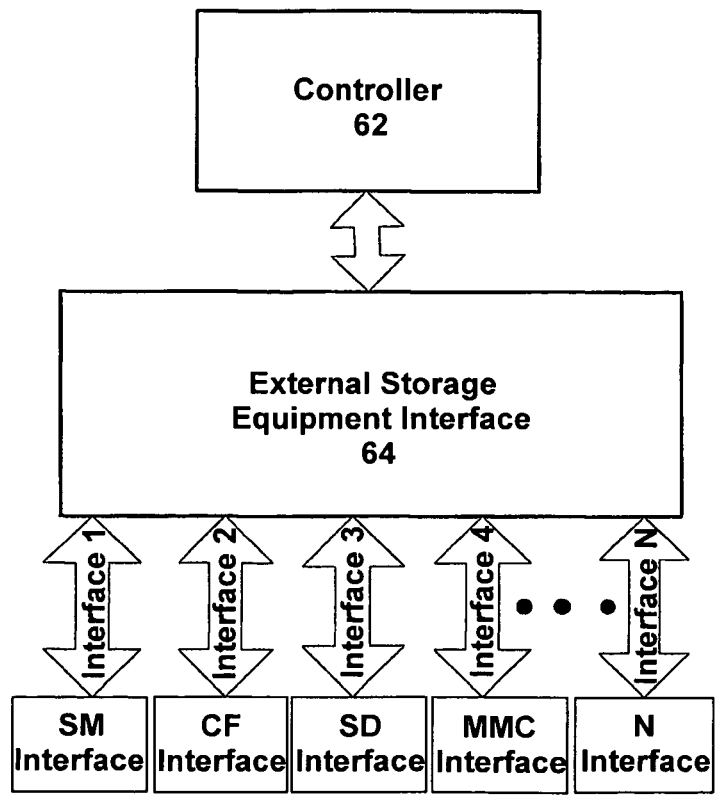
FIG. 4 is a principle block diagram of the interface module of the external storage equipment according to an embodiment of the present invention.

The external storage equipment interface module 64 is an interface for connecting the controller module 62 to the external storage equipment. As shown in FIG. 4, the external storage equipment interface module 64 may be a single interface, or may be a combination of a plurality of uniform interfaces and/or a plurality of interfaces of different types. The interfaces provided in the external storage equipment interface module 64 may include but not limited to SM, CF, MMC, SD, MS, MD and x-D and the like, and may also include USB, IEEE1394, IDE, SCSI, Bluetooth, IrDA, HomeRF, IEEE802.1x and a series of other similar interfaces. The external storage equipment interface module 64 may connect with an external storage equipment such as SM (Smart Media), CF (Compact Flash), MMC (Multi-Media Card), SD (Secure Digital), MS (Memory Stick), MD (Micro-Drive) and x-D (x-D Picture Card), etc., and may also connect a hard disk, a removable hard disk, or other semiconductor storage devices and the like. The external storage equipment interface module 64 is under the control of the controller module 62 to convert the data to be transmitted into a data format adapted to the protocol corresponding to an interface according to the types of the respective interfaces, or to interpret the received data format according to the interface type.

The data exchange and storage device of the present invention provides the operational power supply through the power source module 65. The power source module 65 may obtain the power from external or a self-supplied power source. It may also provide the power through the data processing system via the interface of the system interface module 63. In one embodiment, the power source module uses a self-supplied power source, and is provided with a power control switch that may turn off/turn on the power source of the data exchange and storage device of the present invention. The self-supplied power source may select and use photocell, primary battery and/or rechargeable battery. In addition, the power source module 65 may be provided with a circuit to charge the rechargeable battery when it is connected with the data processing system.

Figure 5:
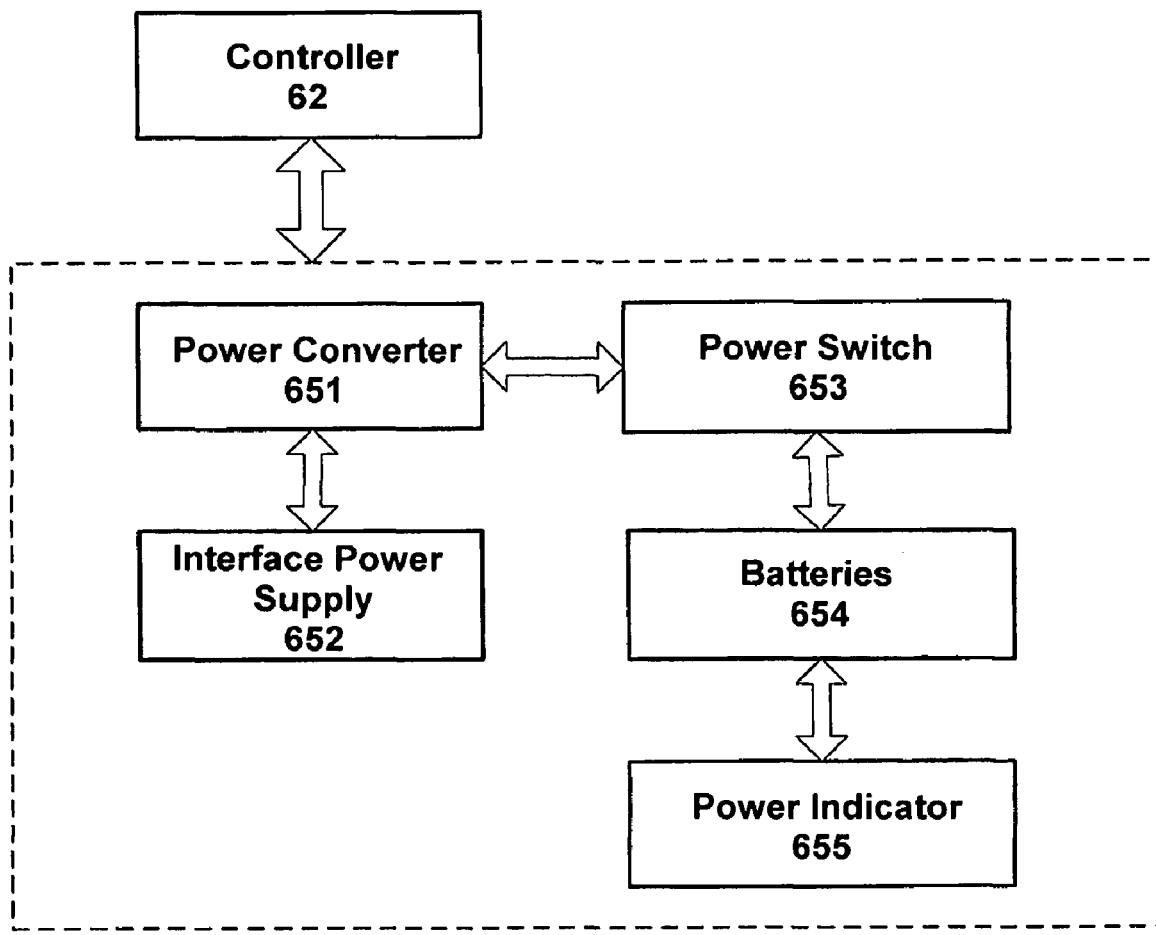
FIG. 5 is a configuration block diagram of the power source module according to an embodiment of the present invention.

As shown in FIG. 5, the power source module 65 includes a power conversion device 651, an interface power source module 652, a power source switch device 653, a battery power source device 654, and a power mode indication device 655. The power source module 65 may realize the power supply from the interface of the data processing system via the interface power source module 652. In this case where the data processing system is not connected, a power supplied by a self-supplied power source may be implemented through the power conversion device 651, the power source switch device 653, and the battery power source device 654.

Figure 12:
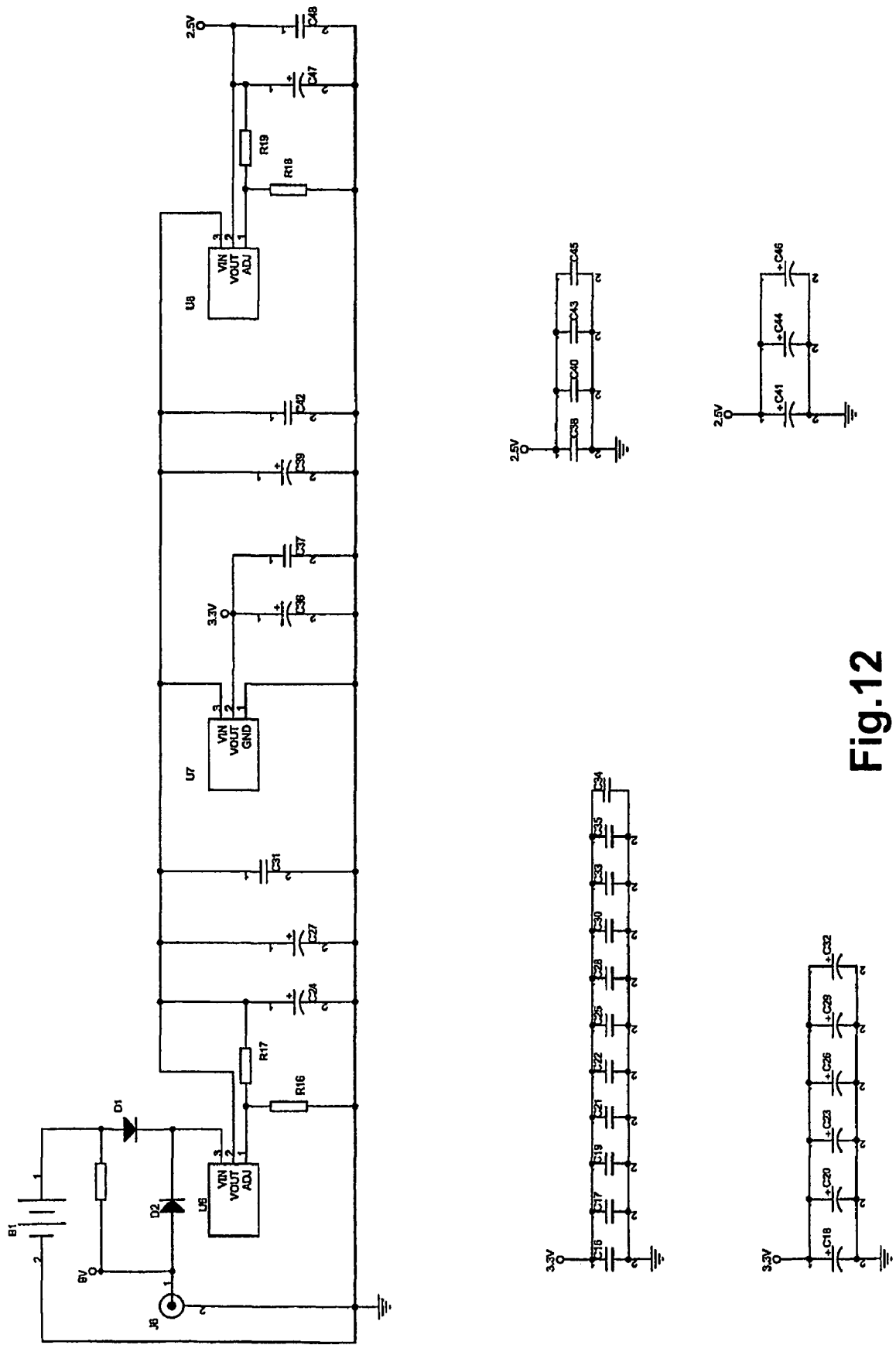
FIG. 12 shows circuit principle of the power source module of FIG. 5.

The circuit principle of the power source module 65 is shown in FIG. 12. The power circuit may provide a plurality of ways of power supplies, and provide the data exchange and storage device of the present invention with a number of operating voltages. The power circuit may enable an interface power source, a battery power source, and an external power source. B1 shown in this figure is a battery power source device, J6 is the jack of an external power source, D1, D2 are allowed to be supplied by choosing one of the interface power sources, the battery power source and the external power source, preferably choosing the interface power source connected with the data processing system. In this figure, a booster U6, resistors R16 and R17, capacitors C24, C27 and C31 constitute an adjustment and regulation circuit of a voltage of +5 V. In this figure, a booster U7, capacitors C36, C37, C39 and C42 constitute an adjustment and regulation circuit of a voltage of +3.3 V. In this figure, a booster U8, resistors R18 and R19, capacitors C47 and C48 constitute an adjustment and regulation circuit of voltage of +2.5V. In this figure, capacitors C16, C17, C19, C21, C22, C25, C28, C30, C33, C34 and C35, and capacitors C18, C20, C23, C26, C29 and C32 constitute, respectively, two groups of filtering circuits of a voltage of +3.3 V. In this figure, capacitors C38, C40, C43 and C45, and capacitors C41, C44 and C46 constitute, respectively, two groups of filtering circuits of a voltage of +2.5 V.

The controller module 62 is the central control module of the data exchange and storage device of the present invention. As shown in FIG. 1, the controller module 62 not only executes the data access commands of the data processing system to the internal memory module 61 and/or the external storage equipment of the present invention, but also realizes reading out the data stored in the external storage equipment and storing it into the internal memory device 61 or reading out the data stored in internal memory device 61 and storing the same to the external storage equipment when the data processing system is not connected. The controller module 62 may support a plurality of interfaces with different standards, which include parallel, serial interface or wireless interface; controlling the system interface module 63 and the external storage equipment interface module 64, interpreting, converting, controlling and transmitting the data and commands based on different interface protocol formats. The specific processes include: identifying the type of the interface to be connected in parallel, in series and/or wirelessly, and selecting the corresponding interface protocol; initializing the connection between the data exchange and storage device of the present invention and the external storage equipment and the data processing system; permitting the data to be exchanged or accessed between the data processing system, the external storage equipment and the internal memory device 61 in accordance with specified methods of the corresponding interface standard protocol.

The controller module 62 has a capability to independently process data, namely, in the case where the data exchange and storage device of the present invention is not connected with any data processing system, it can still access the data stored in the external storage equipments, such as removable storage disks and/or storage cards, which are connected therewith. The capability of independent data process can be realized primarily by the firmware of the controller module 62. The firmware, as part of the data exchange and storage device of the present invention, forms a small or micro operating system (OS), to implement a variety of data processing functions of the device of the present invention. The operational procedure of the firmware in the controller module 62 will be described hereinafter in association with FIG. 9.

First, when a user attaches the data exchange and storage device of the present invention to a corresponding interface of the data processing system, the data processing operating system initializes a system interface when the power is turned on. This includes starting equipment drive programs, and the controller module 62 carries out the following operations:

1) Executing device initialization through the operating system in the controller module 62. The initialization operation includes the initialization of the controller module 62 and peripheral interface chip circuits, the identification and connection to the internal memory module 61, and the identifications and connections to other peripheral devices, and further includes generating a disk identifier for a removable storage device in the data processing system.

2) Detecting whether there are external storage equipments (such as a removable storage disk and storage card) to be inserted into the corresponding interface of the external storage equipment interface module 64. If an external storage equipment is detected, then it will detect the type of the external storage equipment being inserted at the same time, and then select a corresponding protocol for the interface, thereby establishing a connection between the external storage equipment and the data processing system in accordance with the specified methods of the corresponding interface standard protocol.

3) If the data processing system sends an operation request to the internal memory module 61 of the data exchange and storage device, the data processing system will perform the operation of exchanging and accessing data with the internal memory module 61 through the controller module 62.

4) If the data processing system sends an operation request to an external storage equipment inserted into an interface of the data exchange and storage device, the data processing system will perform the operation of exchanging and accessing data with the external storage equipment through the controller module 62.

Figure 9:
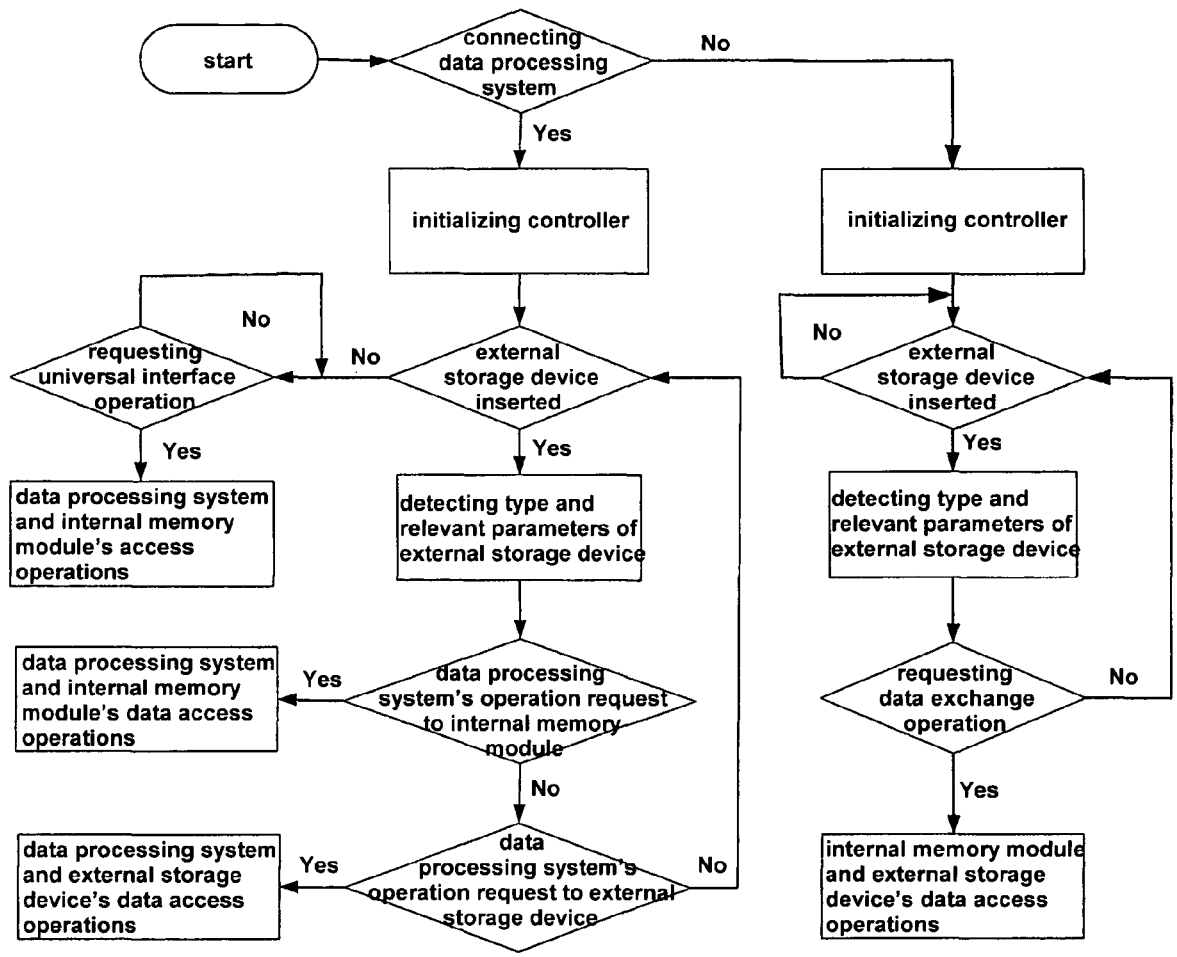
FIG. 9 is an operational flowchart of the data exchange and storage device according to an embodiment of the present invention.
Figure 10:
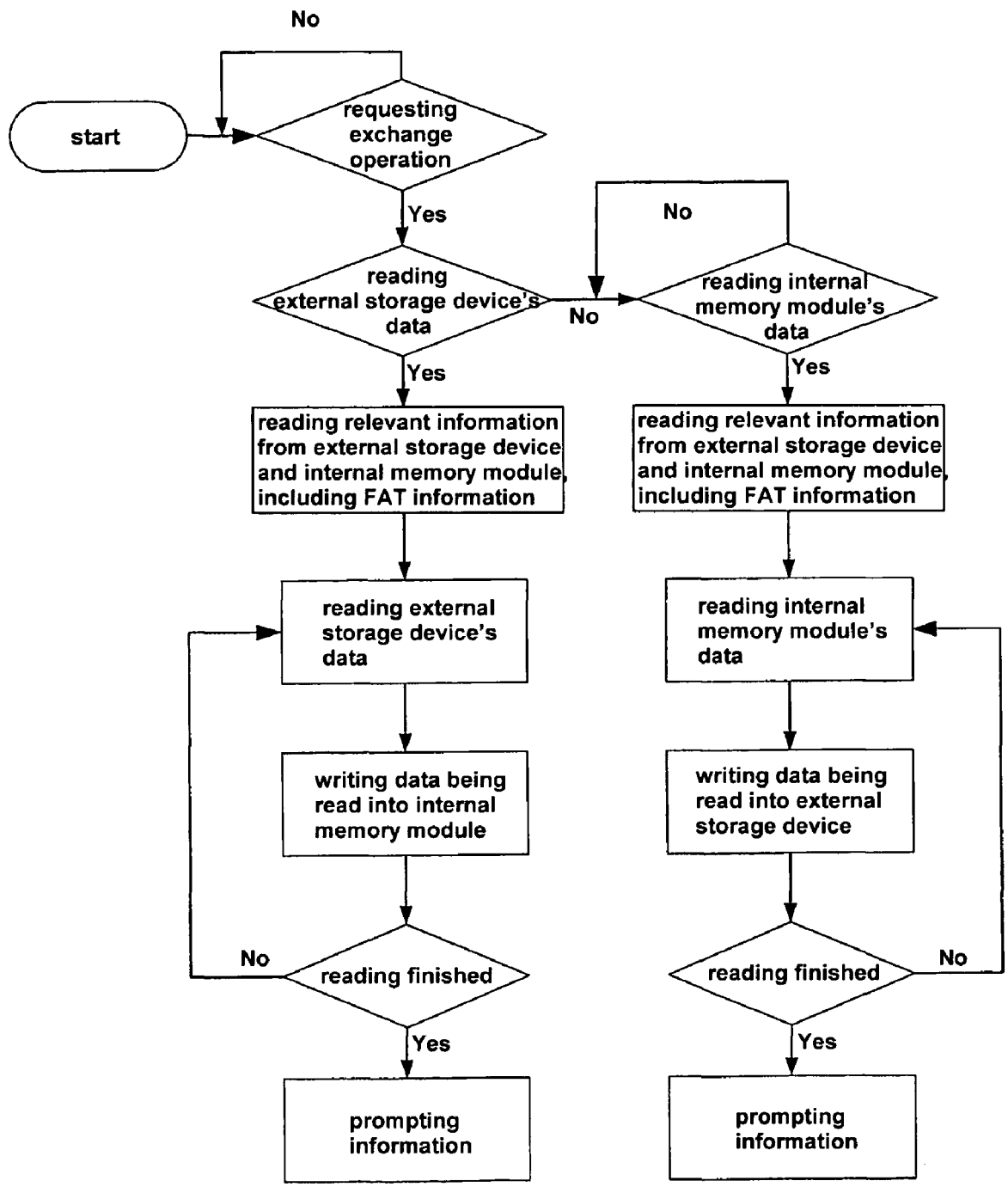
FIG. 10 is a procedural flowchart of data access when the data exchange and storage device is not connected with a data processing system according to an embodiment of the present invention.

In addition, as shown in FIG. 9 and FIG. 10, if a user does not connect the data exchange and storage device of the present invention with the data processing system, but provides it directly with power and sets it into an operational stage, the controller module 62 will carry out the following operations of:

1') implementing device initialization through the firmware (operating system) in the controller module 62, including initialization of the controller module 62 and the peripheral interface chip circuits, identification and connection of the internal memory module 61, and identification and connection of other external devices;

2') detecting if there is an external storage equipments to be inserted into the corresponding interface of the external storage equipment interface module 64; if an external storage equipment is detected, it will detect the type of the external storage equipment being inserted at the same time, interface type and the characteristic information of the device; repeating the above operations if a plurality of external storage equipments of different types are inserted into the corresponding interfaces;

3') selecting a corresponding interface protocol, and establishing a connection of the external storage equipment with the internal memory module 61 in accordance with the specified methods of the corresponding interface standard protocol;

4') responding to the operational requests from the users, which includes reading data in the external storage equipment or the internal memory module 61, writing the data into the internal memory module 61 or the external storage equipment, and generating information prompts to the data read out through an information prompt module, such as the pictures displayed on a liquid crystal display and the like.

Figure 21:
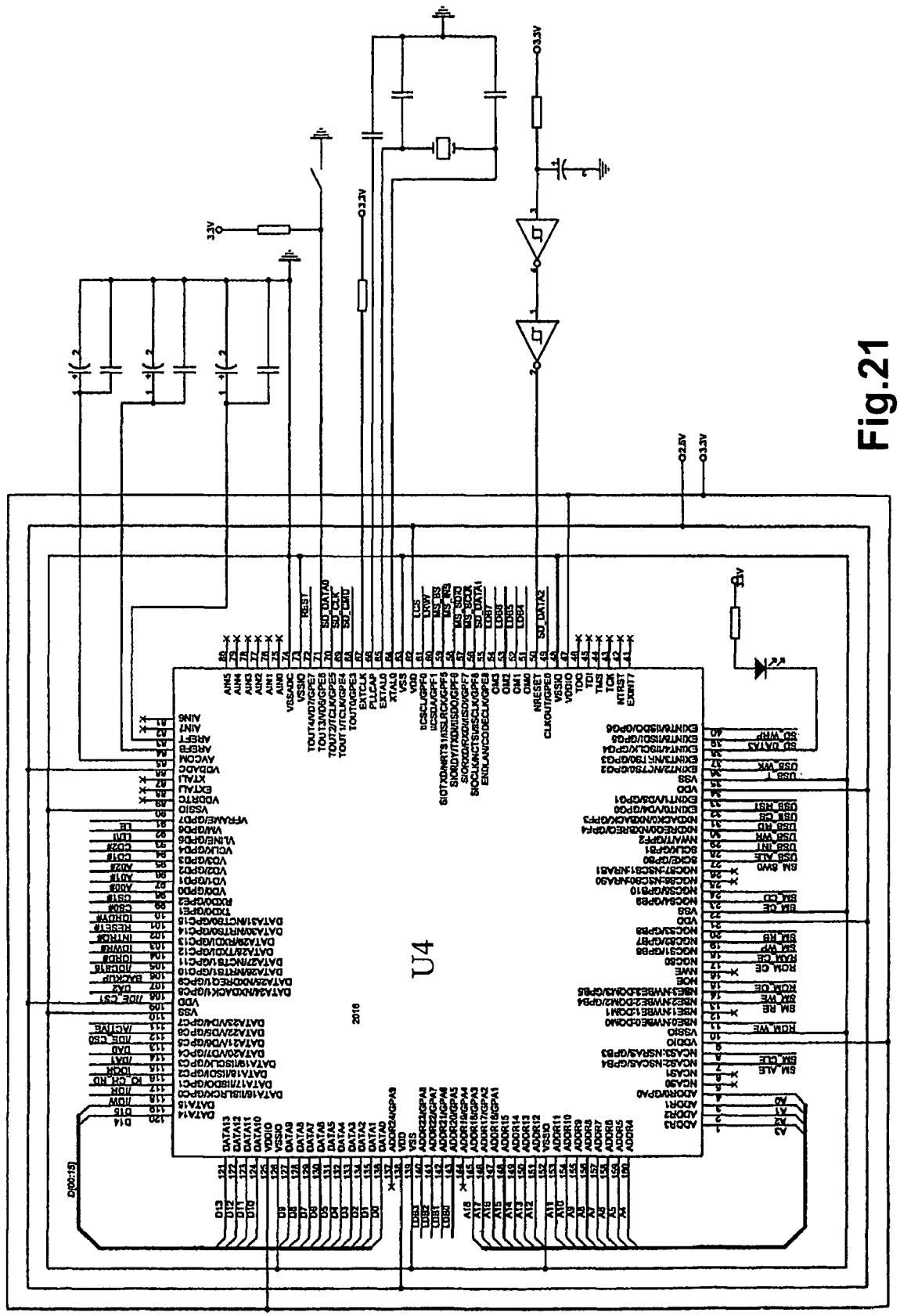
FIG. 21 is a circuit principle diagram of the central controller of the controller module according to an embodiment of the present invention.

The controller module 62 can be divided by functionality, which may include a system interface controller, a core controller and an external storage equipment interface controller. The controller module 62 may be a single controller chip, and may also be formed by connecting a plurality of controller chips, such as the system interface controller, the core controller and the external storage equipment interface controller, in accordance with standard protocol. In the data exchange and storage device of the present invention, the core controller is a core controller chip U4 as shown in FIG. 21. In one embodiment, the core controller chip is a S3C44B0 chip manufactured by SAMSUNG Corp. as a core processor of the data exchange and storage device of the present invention. Not only it enables data exchange and data access between a plurality of interfaces or multiple types of interfaces, different types of data processing systems, external storage equipments, and the internal memory module 61 of the device of the present invention, but more importantly it permits data exchange and data access between the internal memory module 61 and the external storage equipment 10 when the device of the present invention is not connected with any data processing system.

Figure 2:
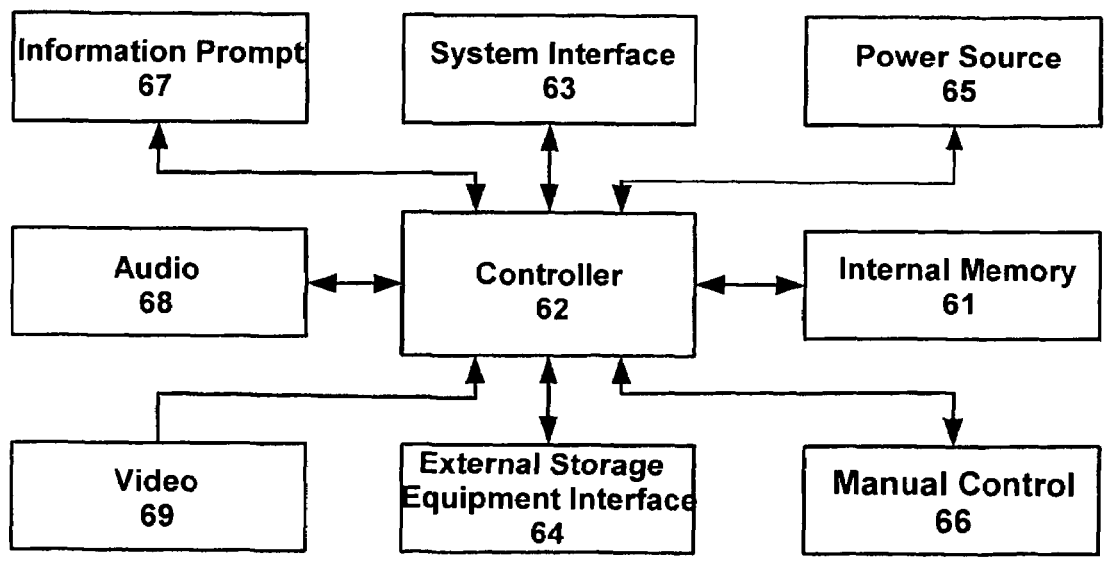
FIG. 2 is a block diagram of a data exchange and storage device with extended functions according to another embodiment of the present invention.

According to a further embodiment of the present invention, the functions and applications of the data exchange and storage device of the present invention may be expended by including one or more extension modules. As shown in FIG. 2, the present invention may further include a manual control module 66, an information prompt module 67, an audio module 68, a video module 69, and other functional modules. These functional modules may be integrated with the other modules of the data exchange and storage device in the previous embodiments, thereby realizing a personal moveable storage center (MSC) with multiple functions.

Specifically, the manual control module 66 may be used primarily for the data exchange and storage device of the present invention to control capture and transmission of data, to control the information prompt, to switch operational modes, and to be an enabling switch. The use of manual control module 66 may realize the manual control of the functions the data exchange and storage device of the present invention, such as, data capture and transmission, information prompt, and switching of operational modes. In one embodiment, the manual control module 66, for example, includes dial switch and keys.

The information prompt module 67 is connected with the controller module 62 to prompt user information and the information of operational modes. The information includes user information, product information, equipment information, and the characteristic information of equipment, the information of operational modes and the information about connection with the external storage equipments, such as, product type, model, and manufacturer of the external storage equipments. The means of information prompt may adopt liquid crystal display, light emitting diode matrix, LED, sound prompt and vibrators. The information prompt module 67 may further include a manual control device, by which the manual control of the information prompt is implemented. The manual control device may be keys, but is not limited to the keys.

The audio module 68 may combine with the internal memory module or the external storage equipment to realize a multi-media function of the device of the present invention, such as, music playing, sound playing, words recitation, recording, etc. The audio module 68 establishes the connections with the controller module 62, the internal memory module 61, the power source module 65, the manual control module 66 and information prompt module 67, respectively. The controller module 62 may control, coordinate the overall operations of the audio module 68. The audio module 68 may have an individual controller, which may also combine with the controller module 62 into one, and include a separate built-in drivers and application programs. The audio files may be stored in the internal memory module 61, and may also be stored in an external storage equipment, such as, CF card, and SM card. It may be further stored in the data processing system connected therewith. The multi-media function of the audio module 68 may be manually controlled through the manual control module 66, and both of the operational information and the mode information of the audio module 68 may be obtained to prompt information through the information prompt module 67.

As an extension module of the data exchange and storage device of the present invention, a video module 69 is used to implement functions of a video system device, such as video information playback and image display, etc. The video module 69 includes a functional interface which is connected with the video system device and through which an external video system device may transfer the acquired video information to the controller module 62 of the storage device of the present invention. The controller module 62 may store the video information in the internal memory module 61 or the external storage equipment. The video information may further be transferred to the data processing system connected with the data exchange and storage device of the present invention. The transmission of the video information may be controlled through the manual control module 66. In addition, the video module 69 may be a micro video device, and may also be an interface connecting the video system device.

Figure 6:
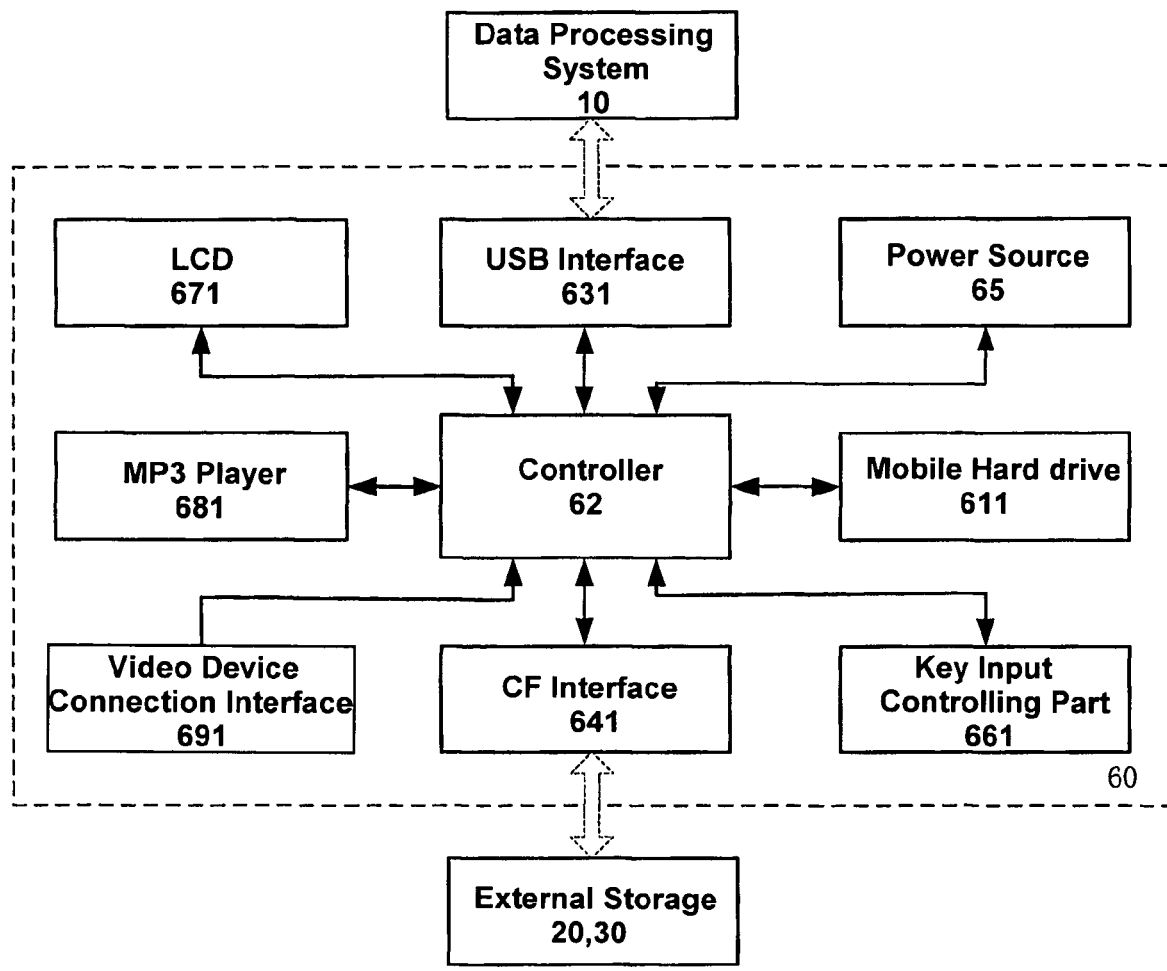
FIG. 6 is a block diagram of the data exchange and storage device implemented by using USB interface and CF interface according to an embodiment of the present invention.

FIG. 6 is an architectural block diagram of one embodiment of the data exchange and storage device of the present invention. In this embodiment, the system interface is a USB interface module 631, the interface of the external storage equipment is a CF interface module 641, and a mobile hard disk drive 671 is used as the internal memory device. In addition, it further includes a liquid crystal display module 671 for information prompt, a keyboard input controlling part 661 for manual operations, an MP3 player 681 for playing audio, and a connection interface 691 of movie device for connecting a movie collecting device. The controller module 62 establishes electrical connections with the mobile hard drive 611, the USB interface module 631, the CF interface module 641, the liquid crystal display module 671, the keyboard input controlling part 661, and the MP3 player 681, respectively. The above electrical connections all support a two-way transmission for signal and data.

In the embodiment, the USB interface is a standard USB interface, For example, a standard miniature USB (Mini-USB, On-The-Go standard). In this case, the USB interface conforms to the USB standard on the aspects such as electric signal, physical structure and physical size. Indeed, the USB interface may also be a non-standard USB interface, namely, only its electric signal conforms to the USB standard, but the physical structure and size do not employ the USB standard.

The USB interface in the embodiment supports USB2.0 standard protocol, and is compatible with USB1.1 standard protocol, and it may realize high-speed data transmission. When it is connected into a USB2.0, its theoretical data transmission rate is up to 480 MB/S.

As shown in FIG. 6, the data exchange and storage device of the embodiment may be connected into a plurality of data processing systems 10 via the USB interface, and perform the transmission and storage of data and information by connecting with external storage equipments via a CF interface (e.g. a removable storage disk 20 and/or a storage card 30). The CF interface is compatible with CF-ATA interface or PCMCIA or True IDE interface. The data exchange and storage device 60 may serve as the external storage equipment connected with the data processing systems 10, and allow the data processing system 10 to read and write data directly on the mobile hard disk drive 611 and the external storage equipment 20 and/or 30. At the same time, the removable storage device of the embodiment may serve as USB Mass Storage and card reader device to support the USB Mass Storage protocol and the CF interface transmission protocol. The data processing systems 10 may not only perform data exchange operations to the external storage equipment 20, 30, but also perform a data exchange operation to the mobile hard disk drive 611. In addition, it may further enable the data exchanges between the external storage equipment 20, 30 and the mobile hard disk drive 611 through the data processing systems 10.

Figure 14:
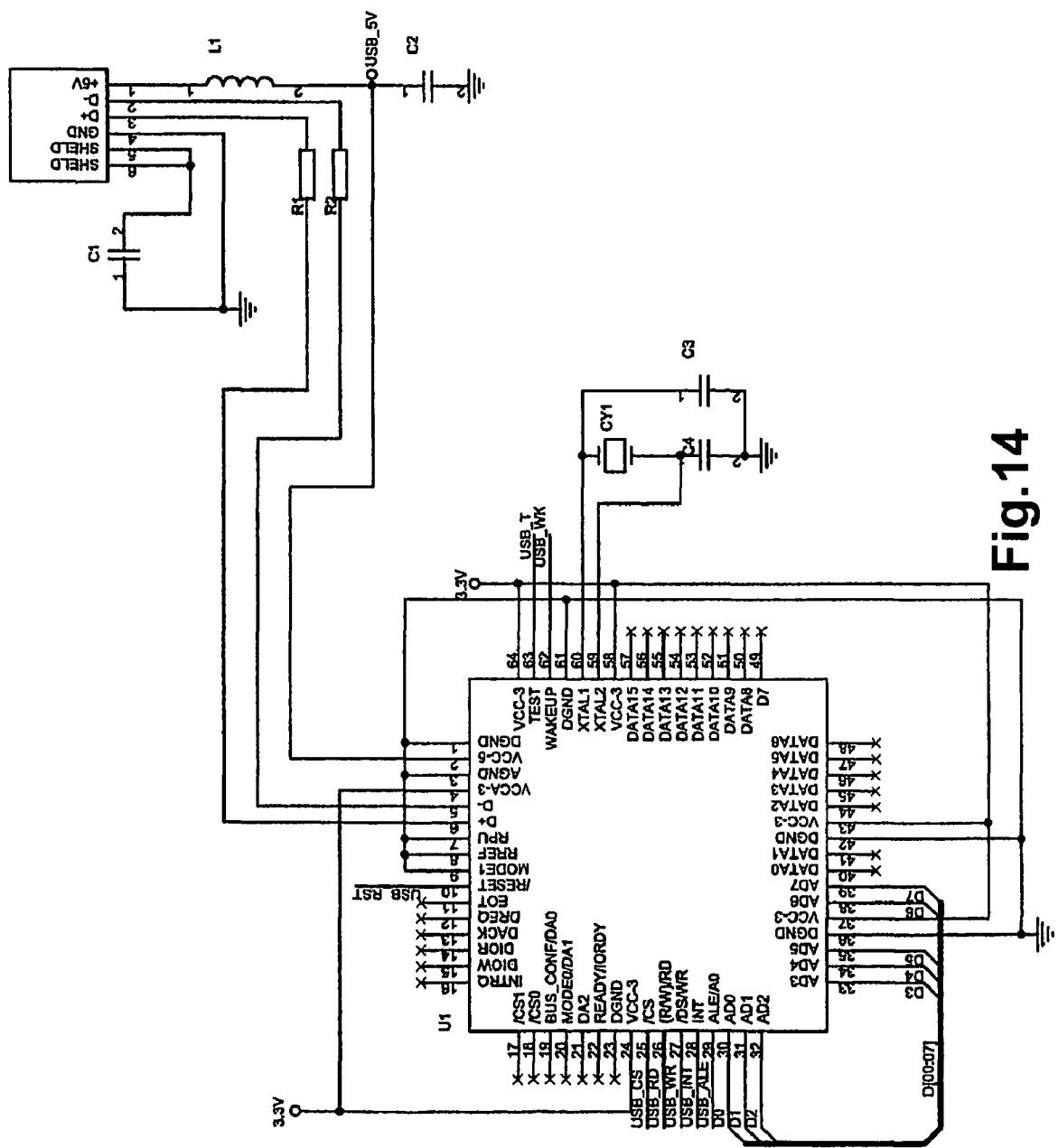
FIG. 14 is a circuit principle diagram where the system interface of FIG. 6 is a USB interface.

The principle circuit diagram of the USB interface module 631 used by the system interface of the embodiment is shown in FIG. 14. The USB interface and the USB controller support the USB2.0 standard protocol. In the figure, J1 is a jack of a USB interface, U1 is a USB controller, and CY1 is a crystal oscillator of 12 MHZ for providing operating pulses to the USB controller U1. USB_T, USB_WK, USB_CS, USB_RD, USB_WR, USB_INT, USB_ALE and USB_RST of the USB controller U1, as transmitting ends of control signals, are respectively connected with the corresponding ends of the core controller U4 as shown in FIG. 21. D0~D7 in the USB controller U1, as data and address transmitting ends, are respectively connected with the corresponding ends of the core controller U4.

The USB interface module 631 enables connections with the data processing system 10, interpreting, converting, controlling and transmitting data and commands based on the USB protocol formats, performing the initialization of the USB interface and controlling, receiving the commands and data transmitted from the data processing systems 10, interpreting and executing the commands transmitted from the data processing system 10, and feeding back the information and data from the core controller U4 to the data processing system 10, thereby establishing the physical and logical connection between the data processing system 10 and the data exchange and storage device 60 of the present invention.

Figure 17:
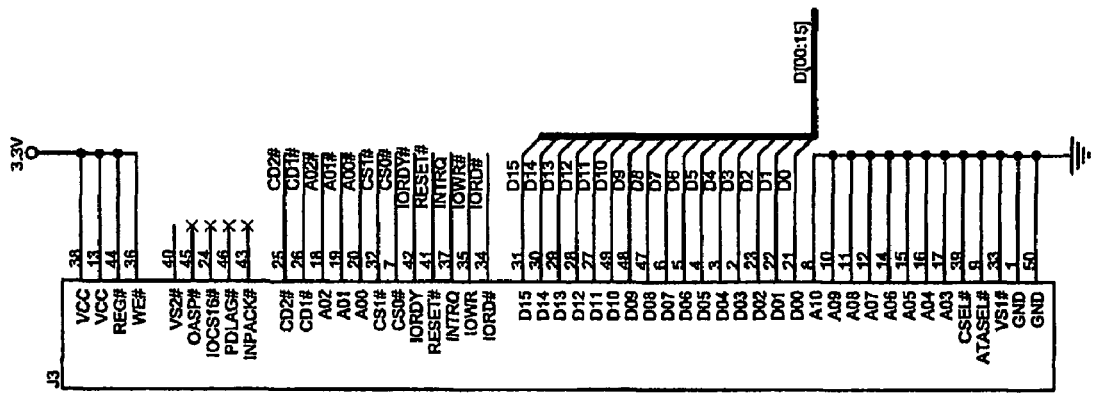
FIG. 17 is a circuit principle diagram where the external storage equipment interface of FIG. 6 is a CF interface.

A principle circuit diagram of the CF interface module 641 used by the external storage equipment interface of the embodiment is shown in FIG. 17. J3 in the figure represents an interface connector of the CF card for connecting a CF card as external storage equipment. The CF interface is compatible with CF-ATA interface or PCMCIA or True IDE interface. CD1#, CD2#, A01#, A02#, CS0#, CS1#, IORDY#, RESET#, IOWR# and IORD#, as transmitting ends of control signals, are respectively connected with the corresponding ends of the core controller U4 as shown in FIG. 21. D0~D15 in the J3, as data and address transmitting ends, are respectively connected with the corresponding ends of the core controller U4.

Figure 16:
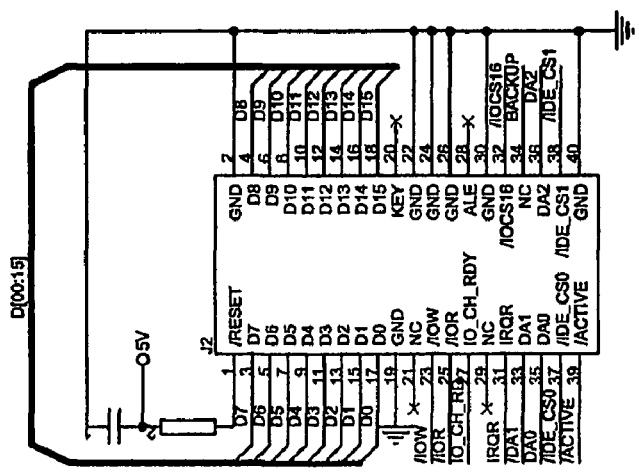
FIG. 16 is a circuit principle diagram of the removable hard disk interface as shown in FIG. 6.

A mobile hard disk drive used as the internal memory module in the embodiment is shown in FIG. 16, wherein J2 is a connector of the mobile hard disk drive for connecting with the mobile hard disk drive 611. The specification of the mobile hard disk drive 611 to be connected is 2.5 inches. Indeed, it may also be a mobile hard disk drive of 1.8 inches. In the figure, /IOW, /IOR, IO_CH_RD, IRQR, /DA1, DA0, /IDE_CS0, /ACTIVE, /IDE_CS1, DA2, BACKUP, / IOCS16, as transmitting ends of control signals, are respectively connected with the corresponding ends of the core controller U4 as shown in FIG. 21. D0~D15 in the J2, as data and address transmitting ends, are respectively connected with the corresponding ends of the core controller U4.

Figure 13:
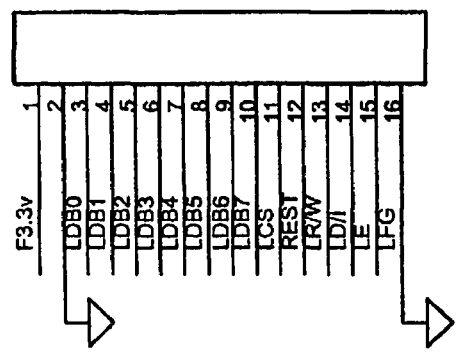
FIG. 13 shows circuit principle of the liquid crystal display module in the data exchange and storage device of the present invention.

A principle circuit diagram of the liquid crystal display module 671 used for information prompt in the embodiment is shown in FIG. 13, wherein LDB0~LDB7, as the display bits for data signals, are respectively connected with the corresponding ends of the core controller U4.

Figure 7:
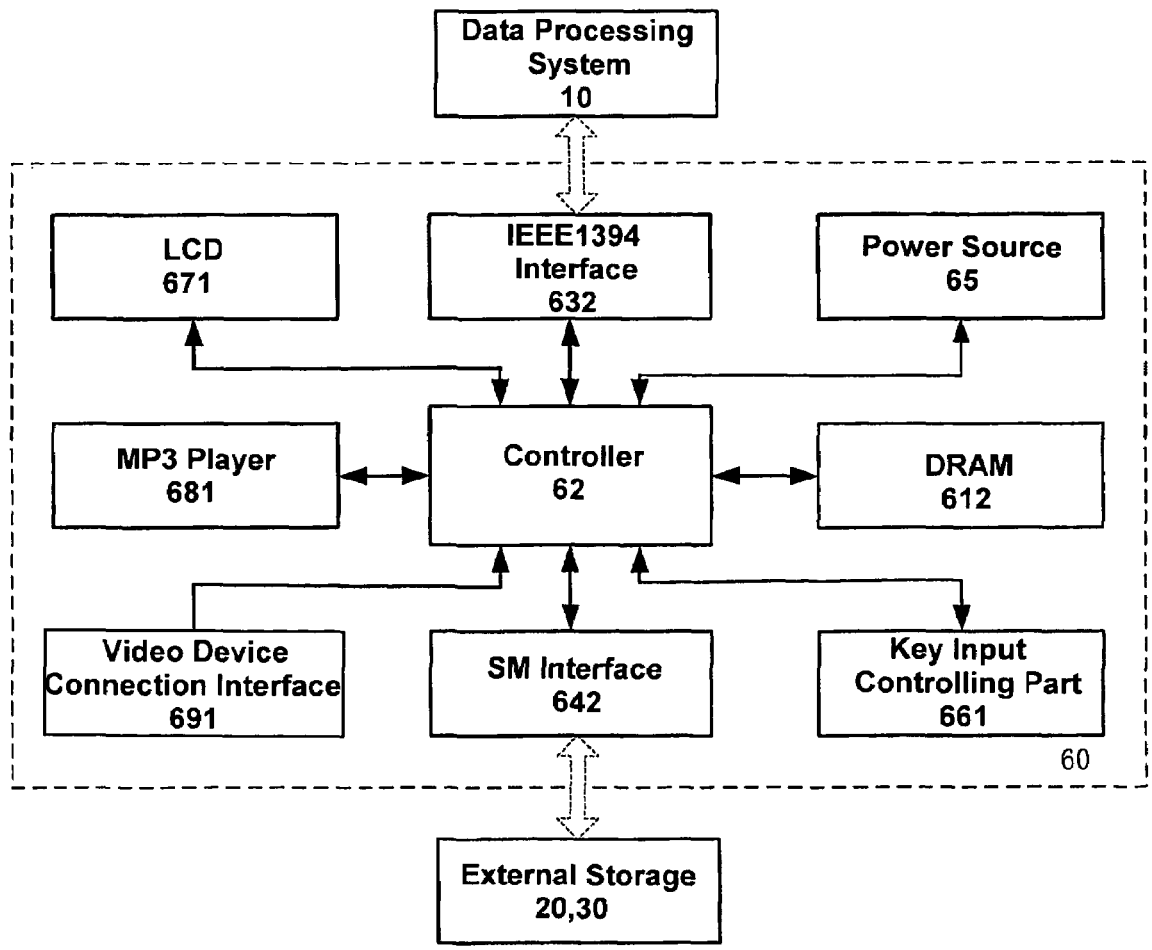
FIG. 7 is a block diagram of the data exchange and storage device implemented by using IEEE1394 interface and SM interface according to another embodiment of the present invention.

FIG. 7 is an architectural block diagram of another embodiment of the data exchange and storage device of the present invention. In this embodiment, the system interface is an IEEE1394 interface module 632. The interface of the external storage equipment interface module is an SM interface module 642, and the internal memory device uses a DRAM storage module 612 having DRAM as a storage medium. In addition, similar to the embodiment shown in FIG. 6, the data exchange and storage device further comprises a liquid crystal display module 671 for information prompt, a key input controlling part 661 for manual operation, a MP3 player 681 for playing audio, and a movie device connection interface 691 for connecting with a movie collecting device. The controller module 62 establishes electrical connections with the DRAM storage module 612, the IEEE1394 interface module 632, the SM interface module 642, the liquid crystal display module 671, the key input controlling part 661, and the MP3 player 681, respectively. In the embodiment, the power source module 65 is self-supplied by battery power to maintain power supply to the DRAM storage module 612 over a long period of time and to prevent the valid data from losing.

In this embodiment, the IEEE1394 interface is a standard IEEE1394 interface, namely, the IEEE1394 interface conforms to the IEEE1394 standard on the aspects such as electric signal, physical structure and physical size. Indeed, the IEEE1394 interface may also be a non-standard IEEE1394 interface, namely, only its electric signal conforms to the IEEE1394 standard, but the physical structure and size do not employ the IEEE1394 standard.

The data exchange and storage device 60 of the embodiment may be connected into a plurality of the data processing systems 10 through the IEEE1394 interface, and may be connected with an external storage equipment having an SM interface (e.g., the removable disk 20 and/or storage card 30) via the SM interface module 642, to transmit and store data and information. The data processing system 10 may directly read and write to the DRAM storage module 612 and the external storage equipment by connecting the data processing system 10 via the IEEE1394 interface. At the time, the data exchange and storage device 60 of the embodiment may act as an IEEE1394 mass storage device and a card reader device to support the IEEE1394 protocol and the SM interface transmission protocol. The data processing system 10 may not only perform a data exchange operation to the external storage equipment, but may also perform a data exchange operation to the DRAM storage module 612. In addition, the data exchange between the external storage equipment and the DRAM storage module 612 may be realized through the data processing system 10.

Figure 15:
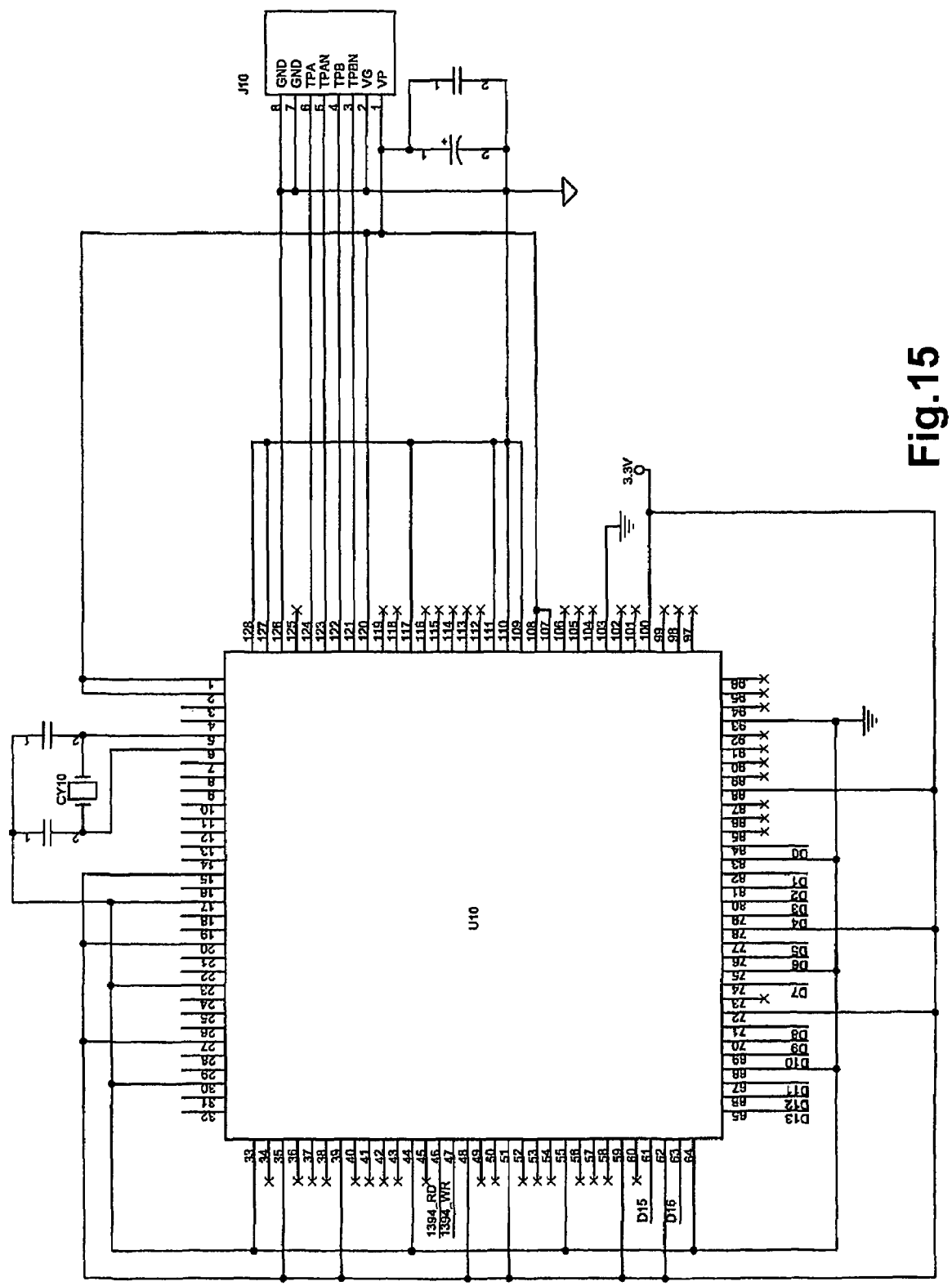
FIG. 15 is a circuit principle diagram where the system interface of FIG. 6 is an IEEE1394 interface.

The principle circuit diagram of the IEEE1394 interface module 632 used by the system interface of the embodiment is shown in FIG. 15. The IEEE1394 interface and the IEEE1394 controller support the IEEE1394 standard protocol. In this figure, J10 is a jack of an IEEE1394 interface, U10 is an IEEE1394 controller, and CY10 is a crystal oscillator of 12 MHZ for providing operating pulses to the IEEE1394 controller U10. 1394_RD and 1394_WR of the IEEE1394 controller U10, as transmitting ends of control signals, are respectively connected with the corresponding ends of the core controller U4 as shown in FIG. 21. D0~D15 in the controller U10, as data and address transmitting ends, are respectively connected with the corresponding ends of the core controller U4.

The IEEE1394 interface module 632 enables connections with the data processing systems 10, interpreting, converting, controlling and transmitting data and commands based on the IEEE1394 protocol formats, performing the initialization of the IEEE1394 interface and controlling, receiving the commands and data transmitted from the data processing systems 10, interpreting and executing the commands transmitted from the data processing systems 10, and feeding back the information and data from the core controller U4 to the data processing systems 10, thereby establishing the physical and logical connections between the data processing systems 10 and the data exchange and storage device 60 of the present invention.

Figure 18:
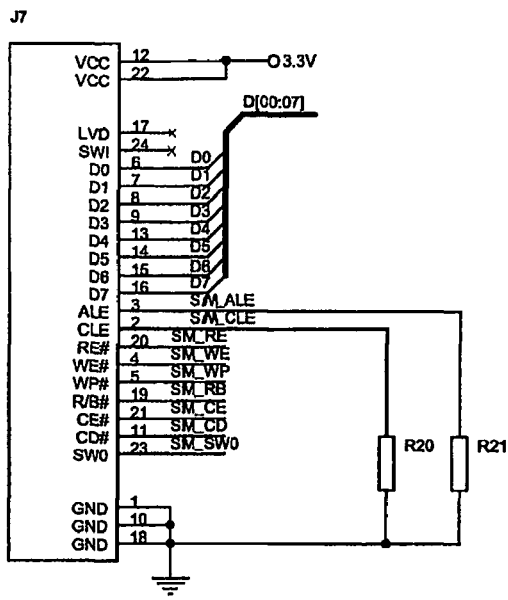
FIG. 18 is a circuit principle diagram shown in FIG. 8 where the external storage equipment interface is an SM interface.

A principle circuit diagram of the SM interface module 642 used by the external storage equipment interface module of the embodiment is shown in FIG. 18. J7 in the figure represents an interface connector of the SM interface for connecting an SM card as external storage equipment. SM_ALE, SM_CLE, SM_RE, SM_WE, SM_WP, SM_R/B, SM_CE, SM_CD and SM_SW0 shown in the figure, as transmitting ends of control signals, are respectively connected with the corresponding ends of the core controller U4 as shown in FIG. 21. In addition, D0~D7 in the J7, as data and address transmitting ends, are respectively connected with the corresponding ends of the core controller U4.

Figure 8:
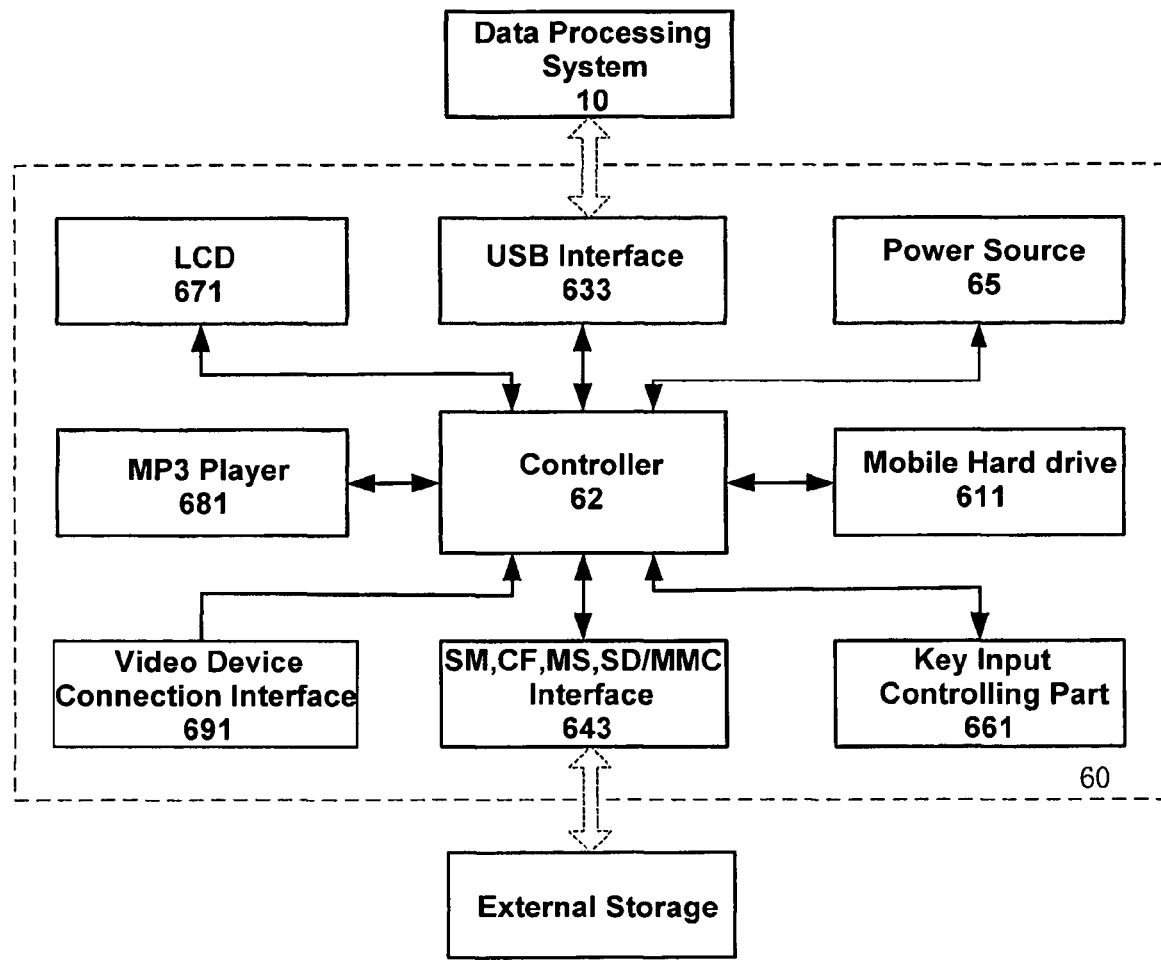
FIG. 8 is a block diagram of the functions of application adopting a plurality of external storage equipment interfaces according to a further embodiment of the present invention.

FIG. 8 is an architectural block diagram of the data exchange and storage device of a further embodiment of the present invention. In this embodiment, the system interface is a USB interface, and the interface of the external storage equipment interface module may be a plurality of interface modules 643, such as, SM, CF, MS, SD/MMC, etc. A mobile hard disk drive 611 is used as the internal memory device. Similar to the embodiments shown in FIG. 6 and FIG. 7, the data exchange and storage device further includes a liquid crystal display module 671 for information prompt, a key input controlling part 661 for manual operation, an MP3 player 681 for playing audio, and a movie device connection interface 691 for connecting with a movie collecting device. The controller module 62 establishes electrical connections with the mobile hard disk drive 611, the USB interface module 633, the external storage equipment interface module 643 (SM, CF, MS, SD/MMC), the liquid crystal display module 671, the key input controlling part 661, and the MP3 player 681, respectively. The above electrical connections all support a two-way transmission for signal and data. The data exchange and storage device 60 of the embodiment may be connected into a plurality of the data processing systems 10 through the USB interface 633, and may be connected with a plurality of relevant external storage equipments, such as SM card, CF card, MS memory stick, SD card and MMC card, etc., via the SM, the CF, the MS and the SD/MMC interface module 643 to transmit and store data and information. The CF interface is compatible with CF-ATA interface or PCMCIA or True IDE interface. The data processing system 10 may directly perform the read and write operations on the mobile hard disk drive 611 and/or the external storage equipment by connecting the data processing system 10 via the USB interface. Thus, the data exchange and storage device 60 of the embodiment may act as USB Mass Storage and card reader device to support the USB Mass Storage protocol and the SM, the CF, the MS and the SD/MMC interface transmission protocol. The data processing system 10 may not only perform data exchange and storage operations to the external storage equipment, but also perform data exchange and storage operations to the mobile hard disk drive 611. In addition, the data exchange between the external storage equipment and the mobile hard disk drive 611 may be implemented through the data processing system 10.

Figure 19:
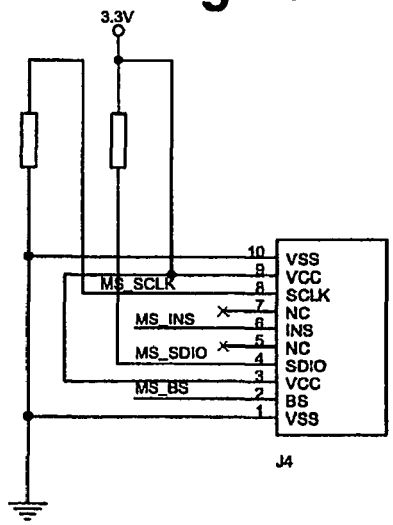
FIG. 19 is a circuit principle diagram shown in FIG. 8 where the external storage equipment interface is an MS interface.
Figure 20:
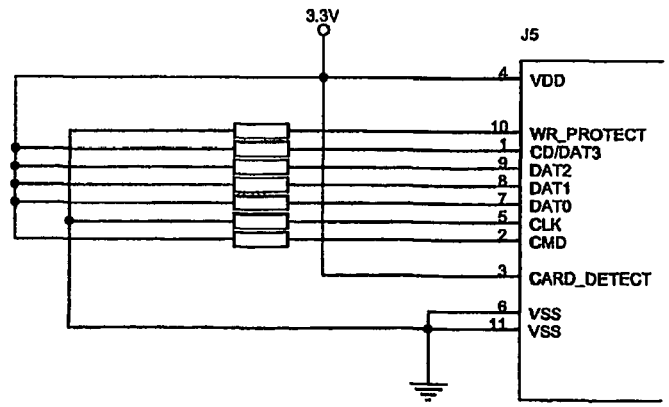
FIG. 20 is a circuit principle diagram shown in FIG. 8 where the external storage equipment interface is an SD/MMC interface.

FIG. 19 and FIG. 20 are principle circuit diagrams of the MS interface and SD/MMC interface of the embodiment. As shown in FIG. 19, J4 is a connector of the MS interface for connecting an MS memory stick as external storage equipment. MS_SCLK, MS_INS, MS_SDIO and MS_BS shown in the figure, as transmitting ends of control signals, are respectively connected with the corresponding ends of the core controller U4 as shown in FIG. 21.

J5 in the FIG. 20 is a connector of the SD/MMC interface for connecting SD card or MMC card. WR_PROTECT, CD/DAT3, CMD and CARD_DETECT, as transmitting ends of control signals, are respectively connected with the corresponding ends of the core controller U4 as shown in FIG. 21. DAT2, DAT1 and DAT0, as the data and address transmitting ends of the SD/MMC, are respectively connected with the corresponding ends of the core controller U4. The data transmissions of the MS interface and the SD/MMC interface are carried out in a serial manner.

Figure 11:
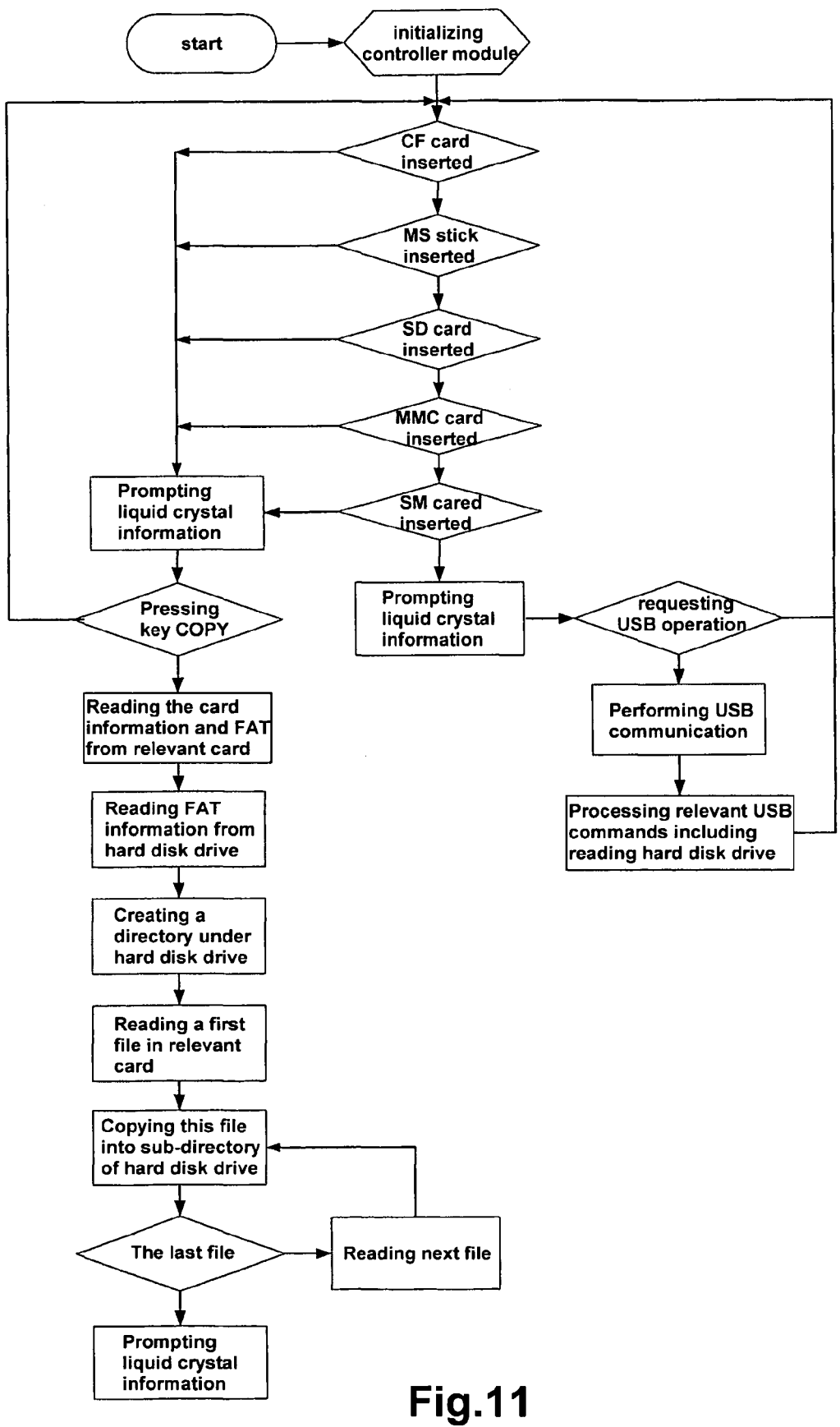
FIG. 11 is an operational flowchart of the data exchange and storage device according to another embodied scheme of the present invention.

FIG. 11 is a processing flowchart of the data exchange and storage device of the embodiment of the present invention shown in FIG. 8. The operational flows of the data exchange and storage device shown in FIG. 6 and FIG. 7 are similar to this example.

If the data exchange and storage device of the present invention is in an operational mode while the power is on, then the controller module 62 performs initialization. The operation of initialization includes the initializations to the controller module 62 and peripheral interface chip circuits, and the identification and connection to the internal memory module 61. At the same time, the controller module 62 detects if there is any external storage equipment to be inserted into the corresponding interface of the external storage equipment interface module 64. If an external storage equipment is detected, it will detect the type of the external storage equipment being inserted, the type of the interface, and the characteristic information of the device. The above operations, which are to detect the type of the external storage equipment being inserted, the type of the interface, and the characteristic information of the device, will be repeated when a plurality of external storage equipments of different types are inserted into the corresponding interfaces. Furthermore, the results of detection can be displayed through the liquid crystal display module 671.

When the data exchange and storage device of the present invention is connected with the data processing system 10 via a USB interface, the controller module 62 receives the commands and information from the data processing system 10. When the data processing system 10 receives a USB operation request, the controller module 62 performs a USB communication with the data processing system 10 in accordance with the USB standard protocol, and executes the USB operation commands of the data processing system 10, for example, performing the read and write operations to hard disks for exchanging and accessing data so as to realize the data exchange between the data processing system 10 and an external storage equipment or a removable hard disk or a DRAM storage module.

If the data exchange and storage device of the present invention 60 is in an operational mode without being connected with the data processing system 10, and a user inputs an operating command through operational keys in the key input controlling part 661 on the device 60, the controller module 62 will execute the relevant operations according to the command, for example, alternatively storing the data in the external storage equipment into the removable hard disk. At the same time, the user may also merely display the data read from the external storage equipment on the liquid crystal display module, and the user may alternatively store the data into the mobile hard disk drive 611 (in the embodiment of FIG. 7, into the DRAM storage module 612) upon requests. The alternative operation may also be controlled through the keys.

Referring to FIG. 11 in detail, the data exchange and storage device shown in FIG. 8 is used as an example. After the user has determined to execute the operation of storing the data in the external storage equipment into the mobile hard disk drive 611 as an internal memory module, the firmware, i.e., the operating system in the controller module 62 will read the device information of the external storage equipment and the removable hard dish 611 from the relevant interfaces. The information includes type of the device, storage capacity, available space, type of the interface and the like of the external storage equipment and the removable hard dish 611. At the same time, the operating system creates a directory corresponding to the external storage equipment located under the relevant directory in the mobile hard disk drive 611. The first file is then read from the corresponding external storage equipment and transmitted into the controller module 62, and the information read out is displayed on the liquid crystal display module 671. Upon the user's confirmation, the file is copied into the relevant directory created in the mobile hard disk drive 611. After the file has been copied, the firmware detects if there still exists non-copied files in the external storage equipment. If such files exist, then the aforementioned copy operation will be repeated till all the files in the external storage equipment have been copied into the mobile hard disk drive 611.

In addition, all the information of the above operational processes, which include device initialization, user operation, data processing operation, file replication operation, and file replication process, may be displayed in the liquid crystal display module 671.

The invention claimed is:

1. A data exchange and storage device, comprising:
   a controller module including a firmware used for controlling the operation of each of modules in the data exchange and storage device and performing data processing and information exchange;
   an internal memory module for storing data under the control of the controller module;
   a system interface module capable of being connected with a data processing system and performing data exchange with the data processing system under the control of the controller module;
   an external storage equipment interface module being connected with an external storage equipment and performing data exchange with the external storage equipment under the control of the controller module; and
   an audio module and/or a video module for combing with the internal memory module or external storage equipments to implement a function of playing multi-media,
   wherein the controller module permits data exchange and data access between any two of the data processing system, the internal memory module, and the external storage equipment, and permits data exchange and data access from the internal memory module to the external storage equipment and from the external storage equipment to the internal memory module without the data processing system.

2. The data exchange and storage device of claim 1, wherein the internal memory module includes a hard disk, a removable hard disk, a semiconductor storage, and an optical medium storage.

3. The data exchange and storage device of claim 2, wherein the storage medium of the semiconductor storage is selected from one of Flash Memory, DRAM, EEPROM, SRAM, FRAM, MRAM and Millipede, and adopts one or more semiconductor chips.

4. The data exchange and storage device of claim 1, wherein the system interface module includes USB interface, IEEE1394 interface, Bluetooth interface, IrDA infrared interface, HomeRF interface, IEEE802.11a interface, IEEE802.11b, IEEE802.11g, SCSI, RS232 and printer parallel port, wired wide area/local area interface and/or wireless wide area/local area interface.

5. The data exchange and storage device of claim 1, wherein the external storage equipment interface module includes SM, CF, MMC, SD, MS, MD or x-D interface.

6. The data exchange and storage device of claim 1, wherein the system interface module and the external storage equipment interface module either include single interface or a group of interfaces of the same type or different types of interfaces.

7. The data exchange and storage device of claim 1, further comprising a power source module for supplying power to the data exchange and storage device from the data processing system through an external power source or a self-supplied battery or the system interface module.

8. The data exchange and storage device claim 1, further comprising a manual control module for performing the manual control of data capture and transmission, information prompt, and operational mode switching.

9. The data exchange and storage device of claim 8, wherein the manual control module includes a dial switch and keys.

10. The data exchange and storage device of claim 1, further comprising an information prompt module for displaying static information and dynamic information.

11. The data exchange and storage device of claim 10, wherein the information includes user information, product information, device information, transmission file information, operational state information and the information of external storage equipments which are connected therewith.

12. The data exchange and storage device of claim 10, wherein the information prompt module includes at least one of a liquid crystal display, a light emitting diode, a sound device and a vibrator.

13. The data exchange and storage device of claim 1, further comprising an eject device arranged at the interface of the external storage equipment interface module, the eject device may eject the external storage equipment after being pressed.

14. The data exchange and storage device of claim 1, wherein the external storage equipment interface module is capable of receiving a removable disk or a storage card.

15. A method of data exchange and storage for realizing data exchange and data storage between the data exchange and storage device, the external storage equipment and the data processing system host through the data exchange and storage device of claim 1, comprising the steps of:

1) the controller module of the data exchange and storage device detecting the characteristic information of the external storage equipments connected with the relevant interfaces of the external storage equipment interface module, selecting the relevant interface protocols according to the characteristic information of the external storage equipments, and establishing connections with the external storage equipments;

2) the controller module controlling data exchange and data access between any two of the data processing system host, the internal memory module of the data exchange and storage device, and the external storage equipment, and controlling data exchange and data access from the internal memory module to the external storage equipment and from the external storage equipment to the internal memory module without the data processing system.

16. The method of data exchange and storage of claim 15, further comprising: the controller module displaying the data read from the external storage equipment or the internal memory module on a display part of an information prompt module according to the operational instructions of the data processing system and the users; and/or outputting the user information, the operational state information of the data exchange and storage device, the relevant information of the external storage equipment through the information prompt module.

17. The method of data exchange and storage of claim 15, further comprising: playing a multi-media data read from the external storage equipment or the internal memory module through an audio module and/or a video module according to the operational instructions of the data processing system and the users.

18. The method of data exchange and storage of claim 15, further comprising: a manual control module transmitting the operational instructions, such as, storing user data, prompting information, switching operational modes, etc., to the controller module.

* * * * *